United States Patent Office 3,072,680
Patented Jan. 8, 1963

3,072,680
BIS-EPSILON-CAPROLACTONES
Paul S. Starcher, Charleston, Samuel W. Tinsley, South Charleston, and Benjamin Phillips, Charleston, W. Va., assignors to Union Carbide Corporation, a corporation of New York
No Drawing. Filed June 1, 1960, Ser. No. 33,115
11 Claims. (Cl. 260—343)

This invention relates to novel polylactones which contain at least one seven-membered lactone ring.

The polylactones within the scope of this invention include:

(1) Bislactones having rings fused at two points.

Example

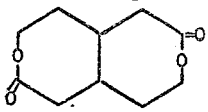

(2) Bislactones having rings with a spiro configuration.

Example

(3) Bislactones in which the rings are directly attached.

Example

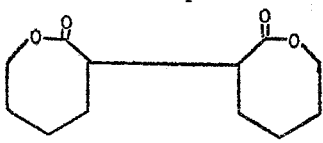

(4) Bislactones in which the rings are separated.

Example

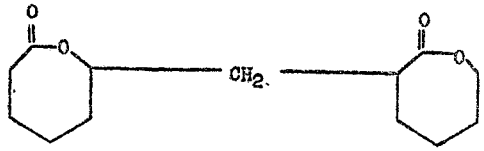

(5) Bislactones in which the rings are separated by other rings which can be aryl, cycloalkyl or heterocyclic.

Examples

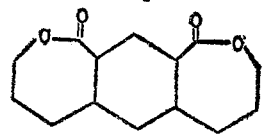

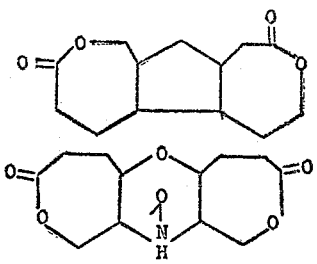

(6) Bislactones in which the rings are separated by radicals, the atoms of which have other reactive groups.

Example

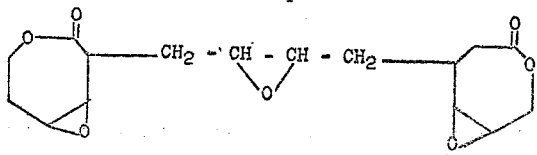

(7) Bislactones in which the rings contain hetero atoms such as N, S, O, P, or Si.

Example

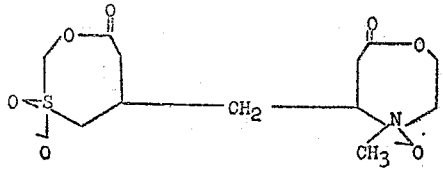

(8) Bislactones having one 7-membered ring and the other lactone ring being an 8 and 9 up to 18 membered ring.

Examples 7, 8

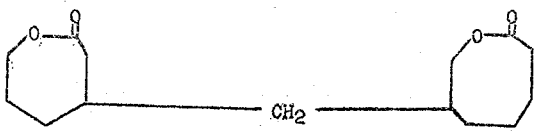

(9) Trilactones.

Examples

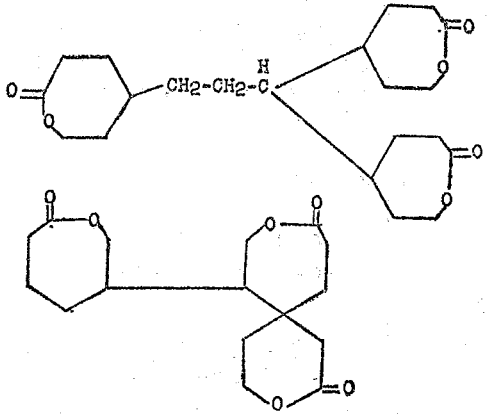

(10) Polylactones which are prepared by converting polyketones prepared by homopolymerizing vinylcycloketone of the formula:

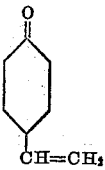

or copolymerizing the vinylcycloketone with other vinyl monomers such as vinyl chloride, acrylonitrile, ethylene, propylene, vinylidene chloride, or mixtures thereof.

Lactone-lactam combinations can be formed, for example, by treating a dilactone with $NH_3$.

Example

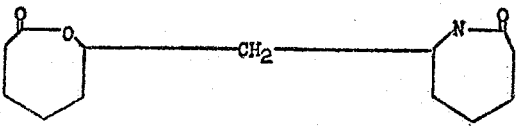

It is to be understood that the foregoing examples are merely representative of the classes of polylactones listed. Many modifications of the above examples are within the scope of this invention. Thus, the lactone rings may have various substituents such as allyl, haloalkyl, alkoxy, alkyl, carboalkoxy, chloro, bromo, and fluoro. It is also intended that where the lactone rings are separated by a group of atoms, the connecting groups are not to be limited to those of the above examples. These groups can include a variety of radicals as will be illustrated by the following list where X is the connecting radical between two lactone rings, at least one of which contains seven members.

$$X = -(CH_2)_n-, \quad -\overset{R}{\underset{}{C}}H-, \quad -\overset{R}{\underset{R}{C}}-$$

$$-(CR_2)_n-SO_2-(CR_2)_n-, \quad -(CR_2)_n-SO-(CR_2)_n-$$

$$-(CR_2)_n-\overset{CH_3}{\underset{O}{N}}-(CR_2)_n-, \quad -\overset{I}{\underset{I}{C}}-$$

$$-\overset{CF_3}{\underset{CF_3}{C}}-, \quad -(CR_2)_n-\overset{R}{\underset{R}{Si}}-(CR_2)_n-$$

$$-CR_2-\overset{O}{\underset{R}{\overset{\|}{P}}}-(CR_2)_n-, \quad -(CR_2)_n-O-(CR_2)_n-$$

$$-C\equiv C-, \quad -O-\overset{O}{\overset{\|}{C}}-O-, \quad -O-\overset{O}{\overset{\|}{C}}-\overset{R}{N}-$$

$$-(CR_2)_n-\overset{O}{\overset{\|}{C}}-O-(CR_2)_n-$$

$$-\overset{R}{N}-\overset{O}{\overset{\|}{C}}-\overset{R}{N}-, \quad -(CR_2)_n-\overset{O}{\overset{\|}{C}}-\overset{R}{N}-(CR_2)_n-$$

$$-O-\overset{R}{\underset{OR}{P}}-O-, \quad -SO_2\overset{R}{N}-, \quad -Ar-$$

$$-\overset{O}{\underset{O}{\overset{\|}{S}}}-O-, \quad -(CR)_2-\underset{}{\bigcirc}-(CR_2)-$$

$$-\overset{O}{\overset{\|}{C}}-\overset{R}{N}-(CR_2)_n-\overset{R}{N}-\overset{O}{\overset{\|}{C}}-$$

and $$-\overset{O}{\overset{\|}{C}}-\overset{R}{N}-AR-\overset{R}{N}-\overset{O}{\overset{\|}{C}}-$$

where R=H, alkyl groups having from 1 to 30 carbon atoms, aryl, and halogen and $n$ is an integer from 0 to 18.

It is also pointed out that in the above classes of polyactones it is possible to have two or more isomeric forms depending upon where the oxygen atom enters into the ring. The factors governing the direction of ring opening can be found in J. Am. Chem. Soc., 80, pages 4079–4082.

A preferred embodiment of the instant invention is when both lactone rings contain seven members. The compounds included in this class can be represented by the following formula:

$$(Y)_m \begin{array}{c} HC \\ | \\ HC \end{array} \begin{array}{c} O \\ \| \\ C-O \\ CH \\ | \\ CH \\ | \\ C \\ H \end{array} - X - \begin{array}{c} HC \\ | \\ HC \end{array} \begin{array}{c} O \\ \| \\ O-C \\ CH \\ | \\ CH \\ | \\ C \\ H \end{array} (Y)_m$$

wherein Y represents hydrogen, halogen and alkyl radicals containing 1 to 6 carbon atoms, $m$ is 3 or 4 and X represents the following divalent radicals:

$$-(C_nH_{2n})_z-$$
$$-C_nH_{2n}-O-C_nH_{2n}-$$
$$-\overset{O}{\overset{\|}{C}}-O-C_nH_{2n}-$$
$$-C_nH_{2n}-SO_2-C_nH_{2n}-$$
$$-O-R-O-$$
$$-C_nH_{2n}-\overset{O}{\underset{R}{\overset{\|}{N}}}-C_nH_{2n}-$$

and $$-O-C_nH_{2n}-SO_2-C_nH_{2n}-O-$$

where $n$ is an integer from 1 to 12. R is a saturated hydrocarbon having 1 to 12 carbon atoms, and $z$ is 0 or 1.

Specific compounds included by the above formula are:

(1)

(2)

(3)

(4)

(5)

(6)

(7)

(8)

(9)

(10)

The novel lactones are prepared by the reaction of the corresponding ketone with a peracid. Among the per-acids which can be employed are peracetic, perbenzoic and performic acids. However, because of the ease of isolation of the product, peracetic acid is preferred. Also, because of the impurities present in commercial peracetic acid, a particularly preferred technique is the use of anhydrous peracetic acid solutions in solvents such as ethyl acetate.

The temperature at which the reaction is conducted is not narrowly critical. Temperatures from about 0° to 100° C. have proven satisfactory. The preferred range is from 30° to 70° C.

The proportion of reactants is also not narrowly critical and molar ratios of peracid to diketone in the order of 1.5 to 20, have proven satisfactory. It is preferred to use an excess of peracid to insure the completion of the reaction. The preferred range of peracid to ketone is about 1.1–1.2 moles of peracid per equivalent of ketone group.

The product may be isolated from the reaction mixture by any conventional method. Thus, distillation, crystallization or both methods, can be used. As an example of the above, if peracetic acid is used as the reactant, the resulting by-product, acetic acid, can be removed by co-distillation with an azeotroping agent such as ethylbenzene. Alternatively, the reaction mixture can be cooled and the product isolated by crystallization.

It is possible to conduct the reaction in either a batch process or a continuous process.

The preferred class of ketones which are employed as starting materials in the process of the instant invention can be represented by the following formula:

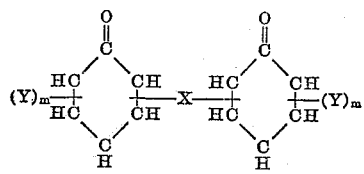

wherein Y, $m$ and X have the meanings previously defined.

The following table illustrates the starting ketones employed and the resulting polylactones produced by treating them with a peracid in accordance with a procedure set forth above.

TABLE

| Ketone | Polylactone |
|---|---|
| | |

TABLE—Continued

| Ketone | Polylactone |
|---|---|
| (4) 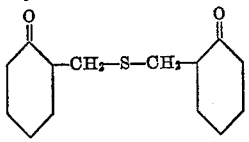 | 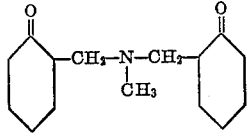 |
| (5) | |
| (6) | |

(1) Obtained by treating with 2 molar equivalents of peracetic acid at 0–20° C.

(2) Obtained by treating with one molar equivalent of peracetic acid at 0–25° C.

(3) Obtained by the addition of ethylene glycol to 2-cyclohexenone in the presence of a base.

(4) Obtained by the addition of thiodiglycol to 2-cyclohexenone in the presence of a base and treating the resulting 3,3'-(2,2'-thiodiethoxy) bicyclohexanone formed with 2 molar equivalents of peracetic acid at 0 to 25° C.

(5) Obtained by the following reaction scheme:

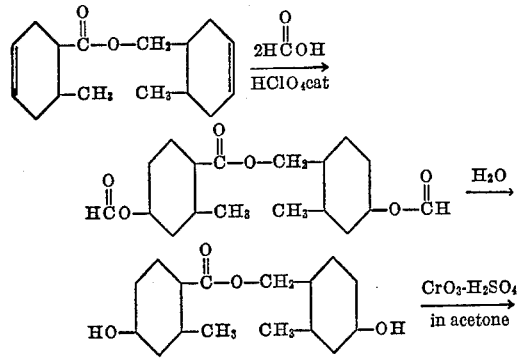

(6) Obtained by the following reaction scheme:

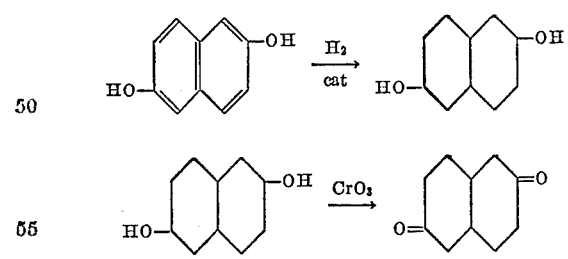

The novel polylacetones of this invention have many important uses. The polylacetones can replace the diisocyanates as cross-linking agents for polyester coatings. They can also be used as curing agents for polyesterplasticized vinyl resin foams and plastisols.

The dilacetones can be reacted with diepoxides such as 3,4-epoxy-6-methylcyclohexylmethyl 3,4-epoxy-6-methylcyclohexanecarboxylate to yield cross-linked polymers useful as coatings. The dilacetones can also be used as modifiers for phenol-formaldehyde and urea-formaldehyde resins.

The dilactones can also be used for the synthesis of many new chemicals. For example, opening of both lactone rings with hydrochloric acid or sodium cyanide to yield many substituted polyacids. These and other reactions of these novel dilactones are illustrated in the following chart where a representative lactone is used as the starting material.

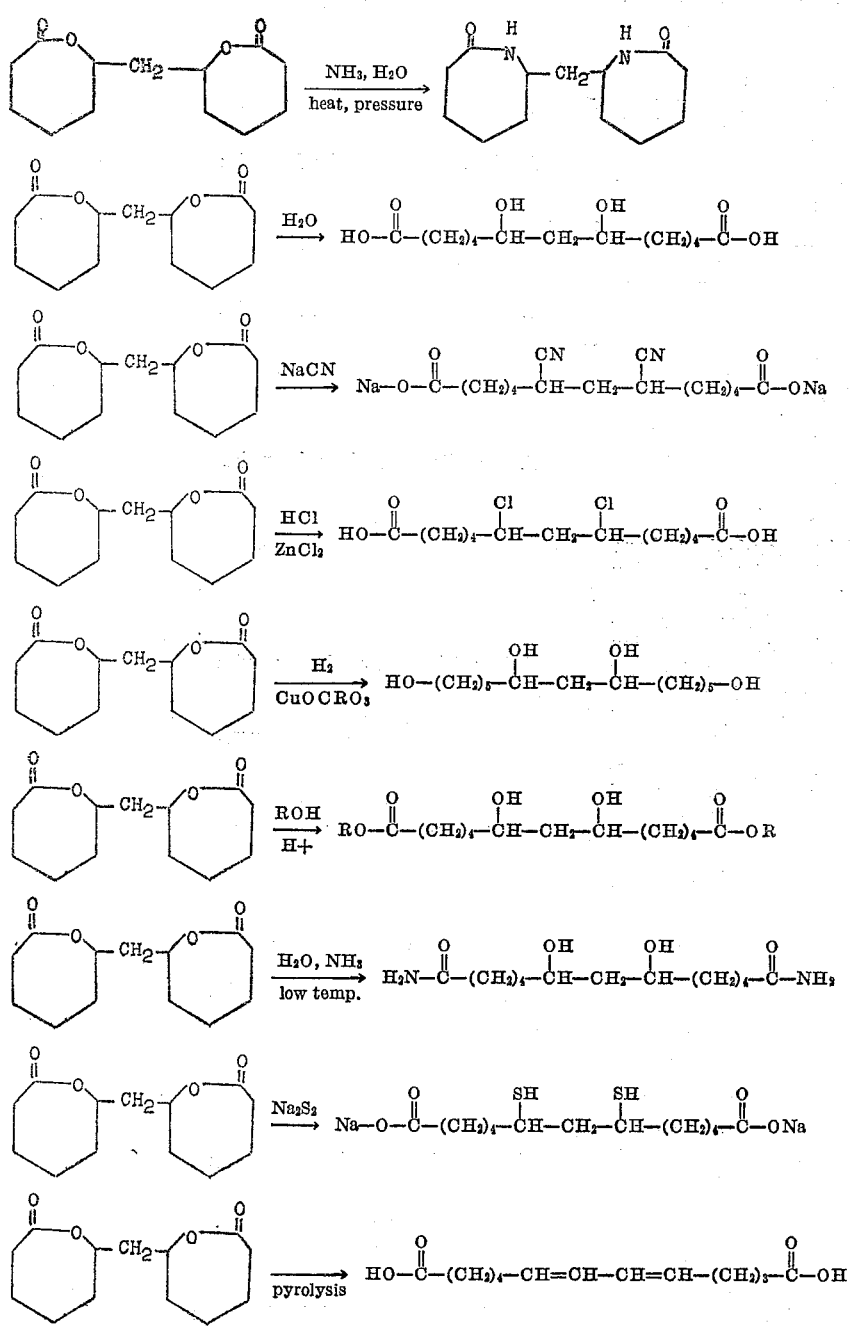

EXAMPLE I

*Preparation of 4,4'-Isopropylidenebis(6-Hydroxyhexanoic Acid ε-Lactone)*

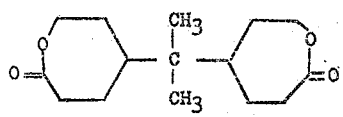

To a solution of 23.6 g. of 2,2-bis(cyclohexanon-4-yl) propane in 100 g. of ethyl acetate was added dropwise over a 10 minute period 71 g. of a 25.6% solution of peracetic acid in ethyl acetate. The temperature was maintained at 40° C. until 30 minutes after the addition, and was then raised to 50° C. and maintained at this temperature for 13.5 hours after which time an analysis for peracetic acid indicated that the reaction was substantially complete. The reaction mixture was cooled to −5° C. The resulting white crystalline product was filtered, recrystallized from methyl amyl ketone, washed with cold acetone and dried. There was obtained 17 g. of 4,4'-isopropylidenebis(6-hydroxyhexanoic acid ε-lactone) having a melting point of 191° C. and a purity of 86% as indicated by saponification.

EXAMPLE II

*Preparation of 4,4'-Isopropylidenebis(6-Hydroxyhexanoic Acid ε-Lactone)*

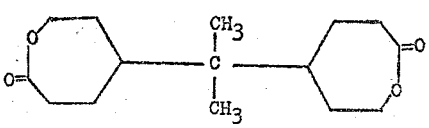

To a solution of 23.6 of 2,2-bis(cyclohexanon-4-yl) propane in 212 g. of ethyl acetate was added (over a 20 min. period) 73 g. of a 25% solution of peracetic acid in ethyl acetate at 50° C. After an additional heating period of 11 hours at 50° C. an analysis for peracetic acid indicated that the reaction was substantially complete. The reaction mixture was cooled in a Dry-Ice bath and the crystallized product was filtered and dried. Yield 21 g. (71%). A small sample was recrystallized twice from methyl amyl ketone, washed with cold acetone, an dried. This product, 4,4'-isopropylidine bis(6-hydroxyhexanoic acid ε-lactone) had the following properties:

| | Found | Calculated for $C_{15}H_{24}O_4$ |
|---|---|---|
| Melting point | 192–193° C | |
| Saponification equivalent | 141 (95% purity) | 134 |
| Percent carbon | 68.6 | 67.2 |
| Percent hydrogen | 9.17 | 9.01 |

The infrared spectrum was consistent with the assigned structure.

EXAMPLE III

Preparation of 6,6'-Methylenebis(6-Hydroxyhexanoic Acid ε-Lactone)

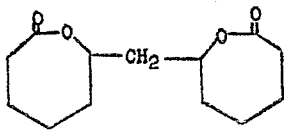

A solution of 55 g. of dicyclohexanon-2-yl methane in 55 grams of ethyl acetate was charged to a reaction vessel, and 184 g. of a 26.2% solution of peracetic acid in ethyl acetate was added dropwise to the reaction vessel at 50° C. over a period of 32 minutes. The reaction was continued an additional 3.5 hours at 50° C. after which time an analysis for peracetic acid indicated the reaction was complete. The reaction mixture was added dropwise to a still, kettle, which contained ethylbenzene under reflux under reduced pressure. Ethyl acetate, peracetic acid, acetic acid, and ethylbenzene were removed continuously during the addition keeping the kettle temperature below 50° C. When the kettle material had been reduced in weight to 151 grams it was removed from the column and cooled to −50° C. and filtered. There was obtained 33 grams of white crystalline 6,6'-methylenebis(6-hydroxyhexanoic acid lactone) corresponding to a yield of 54%. An analytical sample was recrystallized twice from methyl isobutyl ketone and washed with cold ethyl ether. After drying it had the following properties:

| Property | Found | Calculated for $C_{13}H_{20}O_4$ |
|---|---|---|
| Melting point, ° C | 108.5–9 | |
| Saponification equivalent | 119 | 120.1 |
| Percent carbon | 64.99 | 65.0 |
| Percent hydrogen | 8.36 | 8.33 |

We claim:

1. A dilactone of the formula:

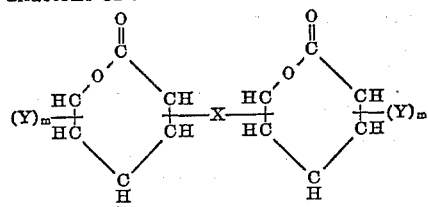

wherein Y is selected from the group consisting of hydrogen, halogen and alkyl having 1 to 6 carbon atoms; X is a radical selected from the group consisting of $-(C_nH_{2n})_z-$, $-C_nH_{2n}-O-C_nH_{2n}-$,

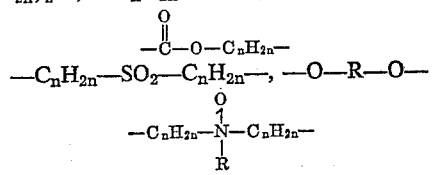

and $-O-C_nH_{2n}-SO_2-C_nH_{2n}-O-$, where $n$ is an integer from 1 to 12, $z$ is an integer from 0 to 1 and R is alkyl having 1 to 12 carbon atoms; and $m$ is the integer 4.

2. The dilactone of the formula:

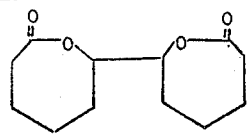

3. The dilactone of the formula:

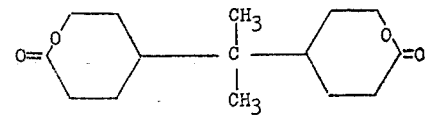

4. The dilactone of the formula:

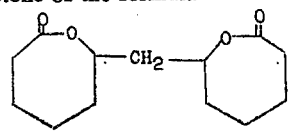

5. The dilactone of the formula:

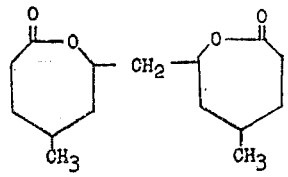

6. The dilactone of the formula:

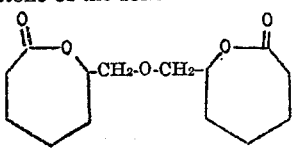

7. The dilactone of the formula:

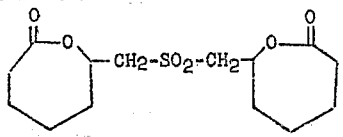

8. The dilactone of the formula:

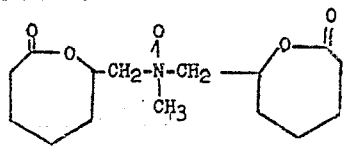

9. The dilactone of the formula:

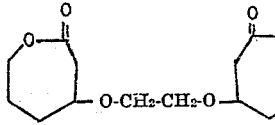

10. The dilactone of the formula:

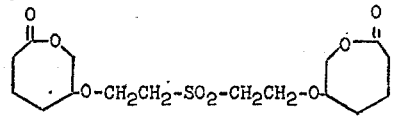

11. The dilactone of the formula:

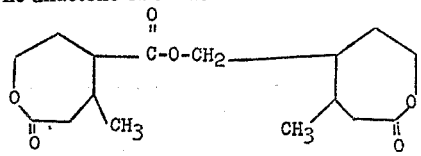

References Cited in the file of this patent

FOREIGN PATENTS 552,726    Belgium _____ Dec. 15, 1956

OTHER REFERENCES

Gilman: Organic Chemistry, Wiley, New York, N.Y., vol. IV (1950), pages 1169–1171.